UNITED STATES PATENT OFFICE.

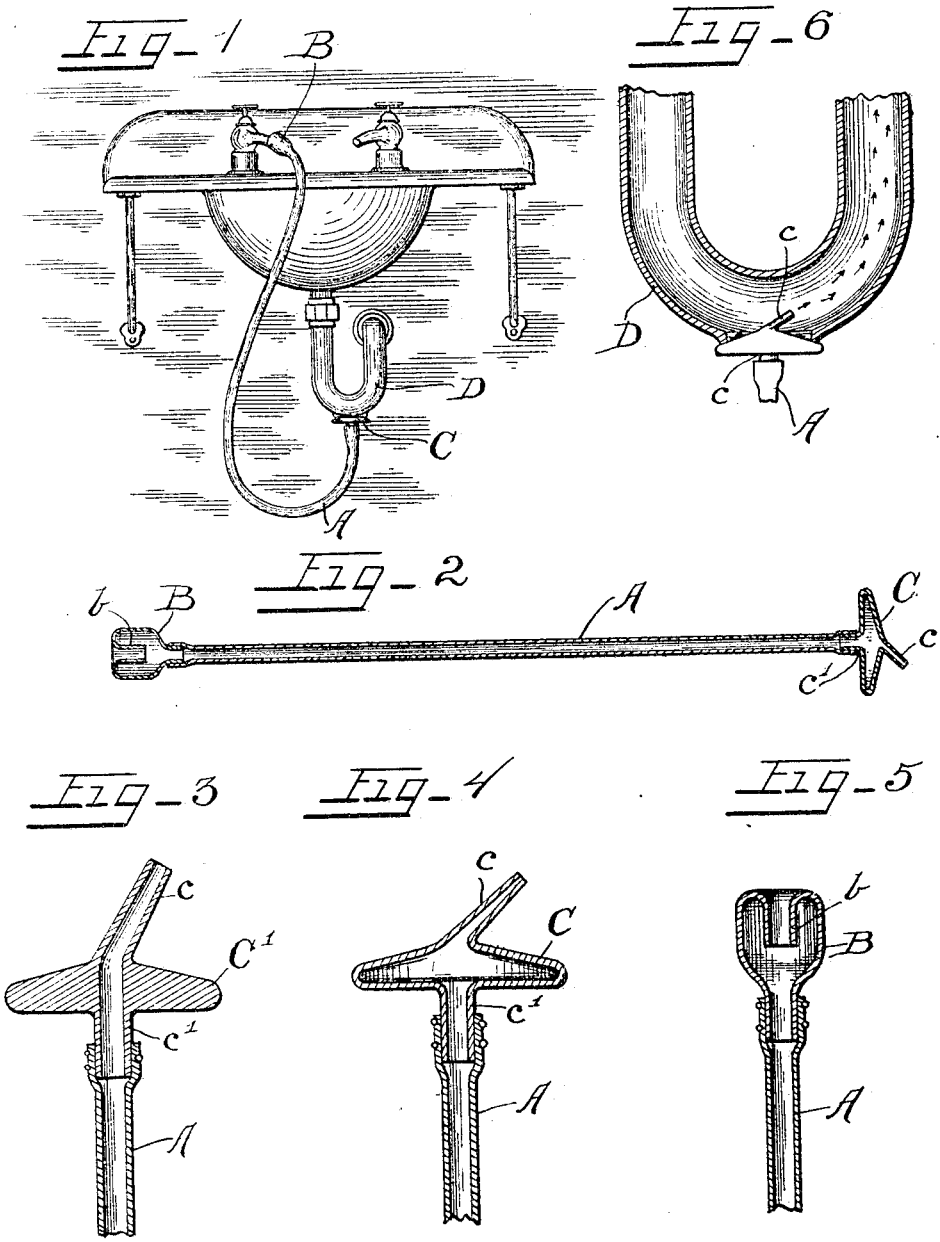

DANIEL B. STRICKLAND, OF RIVER FOREST, ILLINOIS.

FLUSHING DEVICE.

No. 798,713.     Specification of Letters Patent.     Patented Sept. 5, 1905.

Application filed August 20, 1904. Serial No. 221,458.

*To all whom it may concern:*

Be it known that I, DANIEL B. STRICKLAND, a citizen of the United States, and a resident of River Forest, Cook county, Illinois, have invented certain new and useful Improvements in Flushing Devices; and I do hereby declare that the following is a full, clear, and exact description of the same, reference being had to the accompanying drawings, and to the letters of reference marked thereon, which form a part of this specification.

This invention relates to a flushing device, and more particularly to a device adapted for use in flushing traps.

The traps of a plumbing system frequently become clogged with accumulations of refuse which not only interferes with the flow of water therethrough, but also endangers health. These accumulations are frequently difficult to remove, and usually the services of a plumber have been thought necessary for the purpose of cleaning the traps. This entails considerable expense, and frequently much inconvenience and damage occur before the proper assistance can be secured.

The object of the invention is to provide simple and easily-operated means whereby the sediment, lint, or other refuse matter gathered in the trap can be quickly flushed out and the trap thoroughly cleaned without the aid of skilled labor and with the least possible expenditure of labor and trouble.

The invention consists in the matters hereinafter described, and more fully pointed out and defined in the appended claims.

In the drawings, Figure 1 is a front elevation of a toilet-basin to which my invention has been applied. Fig. 2 is a central longitudinal section of a device embodying my invention. Fig. 3 is an enlarged sectional detail of one form of the flushing-head. Fig. 4 is a similar view showing a slightly-different construction of the head. Fig. 5 is a longitudinal section of the head adapted for connection with the source of water-supply. Fig. 6 is an enlarged vertical section of the trap shown in Fig. 1 and illustrates the application and operation of my invention.

As shown in said drawings, A indicates a flexible tube of any desired length or kind provided at one end with a head B, having an inwardly-directed nipple $b$, adapted to be forced over and afford a tight fit upon a faucet-nozzle. This head and the pipe A are usually constructed of rubber, though any other preferred material may be employed.

C indicates a flushing-head which, as shown in Figs. 2 and 4, comprises a hollow conical head, of rubber or other suitable material, having thereon an oblique nozzle $c$, which, as shown, is slightly tapering and adapted to be inserted into the trap through the plug-aperture at the bottom of the trap and directed toward the waste-pipe, as shown in Fig. 6, throwing a strong jet of water under pressure therethrough. If preferred, the flushing-head may be constructed as indicated in Fig. 3, in which the head $C'$ is shown to be solid and having a conical or convex surface adapted to be applied to the plug-aperture trap. Said heads are each connected with the flexible pipe A by means of a tubular extension $c'$, which connects in the tube A.

The operation is as follows: When it is desired to flush a trap, the head B is forced over a faucet-nozzle, as shown in Fig. 1, and the inwardly-turned nipple $b$ affords a tight joint therewith, which is made closer by the pressure of the water within the head when turned on. The screw-plug at the bottom of the trap is then removed, and the flushing-head C or $C'$ is firmly held against the same with the nozzle $c$ directed in the trap toward the waste-pipe when the water is turned through the faucet. The pressure thereof acts in the head B to more firmly engage the same on the faucet-nozzle while the nozzle $c$ of the flushing-head directs a strong jet upwardly in the trap, dislodging and carrying all the accumulated matter therefrom and thoroughly cleaning the trap.

Obviously any preferred construction of flushing-head may be used, and, if desired, may be held in place by the pressure of the fluid flowing therethrough.

I have shown but one of many possible constructions embodying my invention, and I therefore do not purpose to limit myself in this application otherwise than necessitated by the prior art and as stated in the claims, as obviously many details may be varied without departing from the principles of my invention.

I claim as my invention—

1. A flushing device comprising a tube, a head on one end thereof adapted to afford tight connection with a faucet-nozzle, a broad head on the other end adapted to close the plug-aperture in a trap and an inclined nozzle thereon adapted to be directed into a trap and toward the waste-pipe.

2. A flushing-head of the class described comprising a convex resilient body, an oblique nozzle thereon and a nipple adapted to engage a tube to said head.

3. A device of the class described comprising a flexible pipe, an attaching head on one end thereof adapted to be engaged to connect with a source of water-supply, a flushing-head upon the other comprising an inclined restricted nozzle and a convex flange surrounding the same and adapted to bear against the orifice to which the fluid is delivered.

4. In a device of the class described, a flexible pipe, means thereon for attaching the same to a faucet-nozzle, a flushing-head on one end of the pipe comprising a nozzle directed at an angle with the axis of the pipe and a hollow flange surrounding the same adapted to receive a part of the fluid-pressure.

5. A flexible pipe adapted to connect with a source of fluid-supply, a restricted nozzle at the end of the pipe and directed at an angle to the axis thereof and a resilient peripheral convex flange on said nozzle.

6. In a device of the class described a flexible pipe, a broad hollow head on one end thereof, an inwardly-directed nipple thereon adapted to engage a faucet-nozzle, a hollow flushing-head on the opposite end of said pipe provided with a conical upper surface and a restricted oblique nozzle opening therefrom at an angle to the axis of the pipe.

In testimony whereof I have hereunto subscribed my name in the presence of two subscribing witnesses.

DANIEL B. STRICKLAND.

Witnesses:
HJALMAR S. RUDD,
W. W. WITHENBURY.